US012670532B2

(12) United States Patent
Ganelin et al.

(10) Patent No.: US 12,670,532 B2
(45) Date of Patent: \*Jun. 30, 2026

(54) SYSTEMS AND METHODS FOR MODELING DISTRIBUTED SERVICE SYSTEMS BY A LEDGER SYSTEM

(71) Applicant: STRIPE, LLC, South San Francisco, CA (US)

(72) Inventors: Ilya Ganelin, Berkeley, CA (US); Joseph Pereira, Squamish (CA); Sharjeel Sohail, Redmond, WA (US); Peter Bakkum, San Francisco, CA (US)

(73) Assignee: STRIPE, LLC, South San Francisco, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 18/533,732

(22) Filed: Dec. 8, 2023

(65) Prior Publication Data

US 2025/0191076 A1     Jun. 12, 2025

(51) Int. Cl.
*G06Q 40/12* (2023.01)
*G06F 8/35* (2018.01)

(52) U.S. Cl.
CPC .............. *G06Q 40/12* (2013.12); *G06F 8/35* (2013.01)

(58) Field of Classification Search
None
See application file for complete search history.

(56) References Cited

U.S. PATENT DOCUMENTS

| | | | | |
|---|---|---|---|---|
| 11,809,866 B2 * | 11/2023 | Culibrk | | G06F 8/75 |
| 2004/0225919 A1 * | 11/2004 | Reissman | | G06F 11/3604 |
| | | | | 714/38.12 |
| 2005/0188269 A1 * | 8/2005 | El-Shimi | | G06F 11/3604 |
| | | | | 714/38.14 |
| 2005/0262040 A1 * | 11/2005 | Levey | | G06F 16/248 |
| 2007/0022403 A1 * | 1/2007 | Brandt | | G06F 8/36 |
| | | | | 717/100 |
| 2007/0150322 A1 * | 6/2007 | Falchuk | | G06Q 10/0633 |
| | | | | 709/200 |

(Continued)

OTHER PUBLICATIONS

Notice of Allowance received for U.S. Appl. No. 18/533,745, mailed on Jun. 17, 2025, 14 pages.

*Primary Examiner* — Fateh M Obaid
(74) *Attorney, Agent, or Firm* — Finnegan, Henderson, Farabow, Garrett & Dunner, LLP

(57)     ABSTRACT

A method and apparatus are described for modeling a software system of a distributed services system. The method includes receiving a stream of ledger transaction messages generated by a software system, which are then stored in a data store. A ledger system accesses a data model representing a state machine of the proper functioning of the software system. A ledger clearance operation is performed using the state machine and the data stored within the stream of ledger transaction messages in the data store to generate balances within states of the state machine. The ledger system detects an operational characteristic, such as proper function or improper function, of the software system based on a balance of a state in the state machine. Such detection is performed without knowledge of the underlying implementation of the software system.

20 Claims, 11 Drawing Sheets

400

(56)　　　　　　　References Cited

U.S. PATENT DOCUMENTS

| | | | | |
|---|---|---|---|---|
| 2010/0223446 | A1* | 9/2010 | Katariya | G06F 11/3476 |
| | | | | 712/E9.032 |
| 2012/0131543 | A1* | 5/2012 | Sundararajan | G06F 8/36 |
| | | | | 717/104 |
| 2012/0254830 | A1* | 10/2012 | Conrad | G06F 11/3604 |
| | | | | 717/106 |
| 2016/0314061 | A1* | 10/2016 | Spengler | G06F 11/3466 |
| 2020/0234377 | A1* | 7/2020 | Wales | G06Q 20/3829 |
| 2020/0394154 | A1* | 12/2020 | Blackshear | H04L 9/0637 |

* cited by examiner

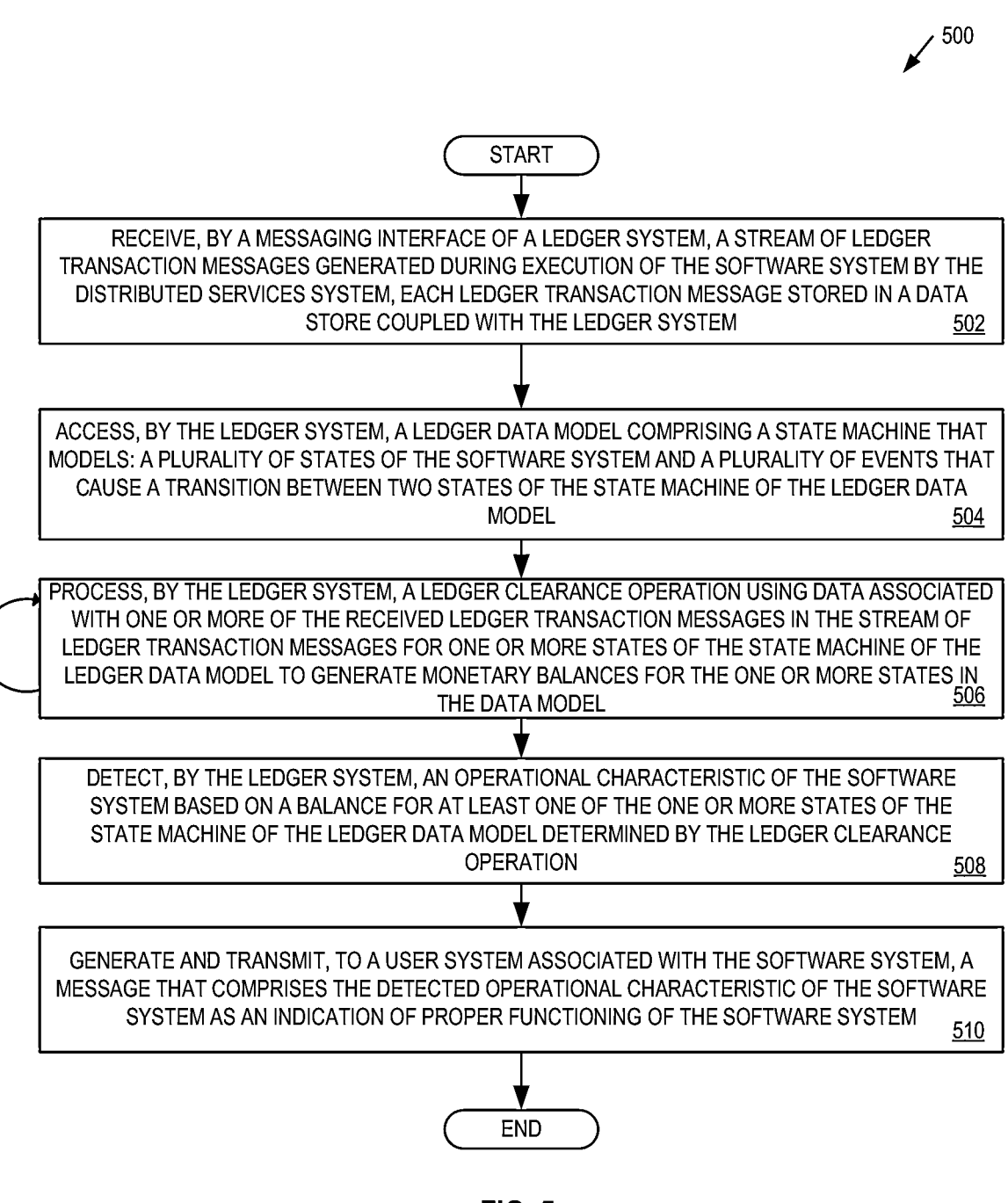

500

START

RECEIVE, BY A MESSAGING INTERFACE OF A LEDGER SYSTEM, A STREAM OF LEDGER TRANSACTION MESSAGES GENERATED DURING EXECUTION OF THE SOFTWARE SYSTEM BY THE DISTRIBUTED SERVICES SYSTEM, EACH LEDGER TRANSACTION MESSAGE STORED IN A DATA STORE COUPLED WITH THE LEDGER SYSTEM          502

ACCESS, BY THE LEDGER SYSTEM, A LEDGER DATA MODEL COMPRISING A STATE MACHINE THAT MODELS: A PLURALITY OF STATES OF THE SOFTWARE SYSTEM AND A PLURALITY OF EVENTS THAT CAUSE A TRANSITION BETWEEN TWO STATES OF THE STATE MACHINE OF THE LEDGER DATA MODEL          504

PROCESS, BY THE LEDGER SYSTEM, A LEDGER CLEARANCE OPERATION USING DATA ASSOCIATED WITH ONE OR MORE OF THE RECEIVED LEDGER TRANSACTION MESSAGES IN THE STREAM OF LEDGER TRANSACTION MESSAGES FOR ONE OR MORE STATES OF THE STATE MACHINE OF THE LEDGER DATA MODEL TO GENERATE MONETARY BALANCES FOR THE ONE OR MORE STATES IN THE DATA MODEL          506

DETECT, BY THE LEDGER SYSTEM, AN OPERATIONAL CHARACTERISTIC OF THE SOFTWARE SYSTEM BASED ON A BALANCE FOR AT LEAST ONE OF THE ONE OR MORE STATES OF THE STATE MACHINE OF THE LEDGER DATA MODEL DETERMINED BY THE LEDGER CLEARANCE OPERATION          508

GENERATE AND TRANSMIT, TO A USER SYSTEM ASSOCIATED WITH THE SOFTWARE SYSTEM, A MESSAGE THAT COMPRISES THE DETECTED OPERATIONAL CHARACTERISTIC OF THE SOFTWARE SYSTEM AS AN INDICATION OF PROPER FUNCTIONING OF THE SOFTWARE SYSTEM          510

END

FIG. 5

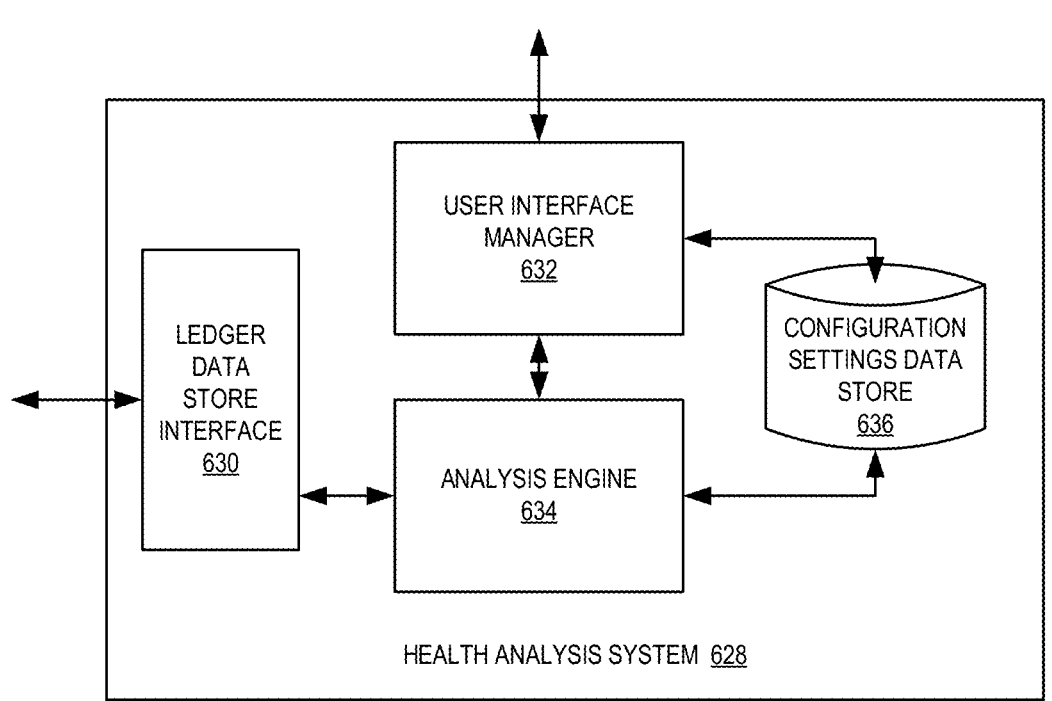
FIG. 6A

```
                              ┌─────────┐
                              │  START  │
                              └─────────┘
                                   │
                                   ▼
```

RECEIVE, BY A MESSAGING INTERFACE OF A LEDGER SYSTEM, A STREAM OF LEDGER TRANSACTION MESSAGES GENERATED DURING EXECUTION OF THE SOFTWARE SYSTEM BY THE DISTRIBUTED SERVICES SYSTEM, EACH LEDGER TRANSACTION MESSAGE STORED IN A DATA STORE COUPLED WITH THE LEDGER SYSTEM, AND THE STREAM COMPRISING LEDGER TRANSACTION MESSAGES FOR A PLURALITY OF TRANSACTIONS PERFORMED BY THE SOFTWARE SYSTEM    702

ACCESS, BY THE LEDGER SYSTEM, A LEDGER DATA MODEL COMPRISING A STATE MACHINE THAT MODELS: A PLURALITY OF STATES OF THE SOFTWARE SYSTEM AND A PLURALITY OF EVENTS THAT CAUSE A TRANSITION BETWEEN TWO STATES OF THE STATE MACHINE OF THE LEDGER DATA MODEL    704

PROCESSING, BY THE LEDGER SYSTEM, A LEDGER CLEARANCE OPERATION WITH DATA FROM A SUBSET OF THE RECEIVED LEDGER TRANSACTION MESSAGES FOR STATES OF THE STATE MACHINE OF THE LEDGER DATA MODEL TO GENERATE MONETARY BALANCES OF STATES IN THE DATA MODEL    706

GENERATING, BY THE LEDGER SYSTEM, VALUES OF OPERATIONAL CHARACTERISTICS OF THE SOFTWARE SYSTEM BASED ON AN AGGREGATION OF BALANCES FOR EACH STATE OF THE STATE MACHINE OF THE LEDGER DATA MODEL DETERMINED BY THE LEDGER CLEARANCE OPERATION OVER THE SUBSET OF THE RECEIVED LEDGER TRANSACTION MESSAGES    708

CAUSING DISPLAY OF, BY THE LEDGER SYSTEM, A USER INTERFACE THAT DISPLAYS THE VALUES OF THE OPERATIONAL CHARACTERISTICS OF THE SOFTWARE SYSTEM AGGREGATED OVER THE SUBSET OF THE RECEIVED LEDGER TRANSACTION MESSAGES    710

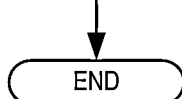

FIG. 7

SYSTEMS AND METHODS FOR MODELING DISTRIBUTED SERVICE SYSTEMS BY A LEDGER SYSTEM

RELATED APPLICATIONS

The present application is related to U.S. patent application Ser. No. 18/533,745, titled "Systems and Methods for Health Analysis Of A Modeled Software System", filed on the same day as the present application, and is incorporated by reference herein in its entirety.

BACKGROUND

Merchants, such as grocers, car services, dry cleaning services, online marketplaces, etc., provide their products and services to consumers. Such merchants may employ agents to deliver their products and/or provide the actual services to the merchant's customers. For example, a person acting on the merchant's behalf will drive a consumer in their own car, deliver food ordered through a merchant website, pick up and/or drop off clothes dry cleaned by the merchant, etc.

These merchants, although providing systems for supplying products and/or services to consumers, often do not perform the financial processing associated with the merchant transactions. Instead, merchants utilize commerce systems to process financial transactions for the products and/or services provided to consumers. This may include the merchant, agent, and other users establishing accounts with the commerce system. Once the accounts are established, merchants can run financial transactions using the services of the commerce system, merchant agents can accept payments from customers on behalf of the merchant for provided products and/or services, and the commerce system can process the payments, perform payouts for services rendered, as well as other financial processing services. This processing of payments by the commerce platform may include running credit cards, crediting a merchant account for the transaction, crediting the agent responsible for the transaction, debiting a commerce system fee for processing the transaction on behalf of the merchant, interacting with authorization network systems (e.g., bank systems, credit card issuing systems, etc.), receiving transfers of funds from or on behalf of merchants, as well as performing other commerce related transactions for the merchant and/or agent such as providing payouts for products/services rendered on behalf of a merchant, managing subscriptions to services of the merchants, managing data on behalf of the merchants, performing regulatory compliance and/or tax services for the merchants, as well as other services.

The commerce platform will therefore typically execute a multitude of services with underlying software systems that operate independently of one another, as well as interact with one another, to enable each of the various services offerings. In modern computing, such a system is often referred to as a distributed services system where one or more server computer systems provide resources for each service's software system. Then, each service can be implemented as a different and independent software system, and/or interact with the software systems of other services, to provide implementation of each service. For example, a subscription service of a commerce platform is executed independently of a charge clearing service which is executed independently of an account top-up service. To complicate this scenario, the service systems may use any number of different underlying programming languages, implementations, data formats, etc. in their respective implementations. Therefore, determining whether these various software systems with their various implementations are executing as expected, and therefore properly carrying out their intended functions and services, becomes increasingly complex in distributed service systems. A technical solution for determining whether software systems are executing as expected with a commerce platform is therefore required.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIG. 5 is a flow diagram of one embodiment of a method for modeling a software system by a ledger system for determining proper function of the software system.

FIG. 6A is a block diagram of a health analysis system of a ledger system for performing health analysis of a modeled software system.

FIG. 7 is a flow diagram of one embodiment of a method for performing a health analysis of a modeled software system of a distributed services system.

DETAILED DESCRIPTION

Figure 1:
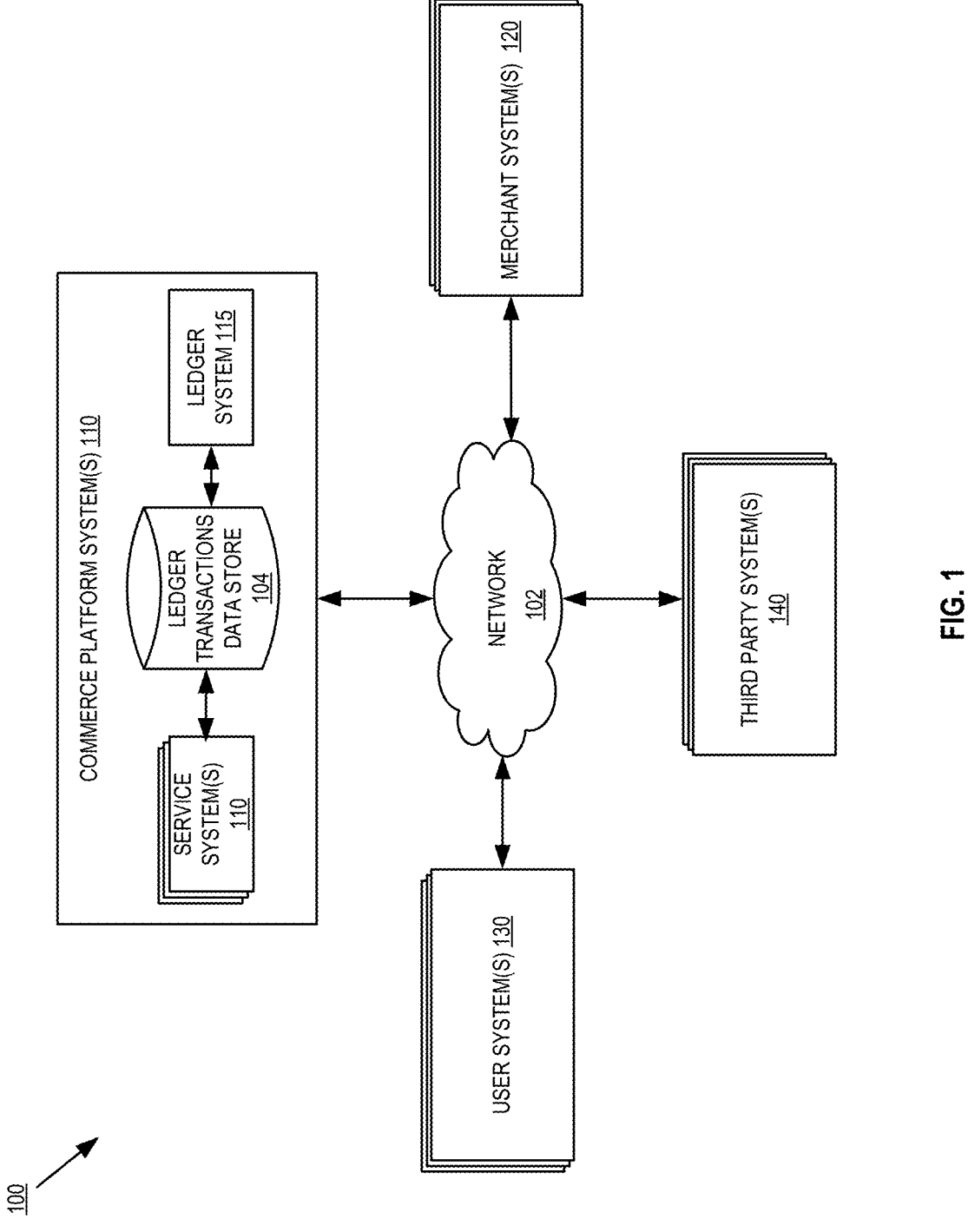
FIG. 1 is a block diagram of an exemplary system architecture for modeling a software system by a ledger system for determining proper function and healthy operation of the software system.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "accessing", "processing", "detecting", "determining", "generating", "transmitting", "identifying", "updating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture for modeling a software system by a ledger system for determining proper function and healthy operation of the software system. In one embodiment, the system 100 includes commerce platform system(s) 110, one or more merchant system(s) 120, one or more user system(s) 130, and one or more third party system(s) 140 (e.g., regulatory systems, banking systems, card network systems, authentication systems, etc.). In one embodiment, one or more systems (e.g., system 120, 130, and 140) may be computer systems, such as a desktop computer system, laptop computer system, server computer systems, etc. The commerce platform system(s) 110, merchant system(s) 120, and third party system(s) 140 may also be one or more computing devices, such as one or more server computer systems, desktop computer systems, etc.

The embodiments discussed herein may be utilized by a plurality of different types of systems, such as other commerce platform system(s) including payment processing systems, card authorization systems, banks, and other systems seeking to trace transactions, as discussed herein. Furthermore, any system seeking to verify the proper function and operational health of distributed and independent software systems may utilize the techniques discussed herein. However, to avoid obscuring the embodiments discussed herein, the modeling of software systems by a ledger system for determining proper function and healthy operation of the software systems is discussed in terms of an example commerce platform system to illustrate and describe the embodiments of the present invention, and is not intended to limit the application of the techniques described herein to other systems.

The commerce platform system(s) 110, merchant system(s) 120, user system(s) 130, and third party system(s) 140 may be coupled to a network 102 and communicate with one another using any of the standard protocols for the exchange of information, including secure communication protocols. In one embodiment, one or more of the commerce platform system(s) 110, merchant system(s) 120, user system(s) 130, and third party system(s) 140 may run on one Local Area Network (LAN) and may be incorporated into the same physical or logical system, or different physical or logical systems. Alternatively, the commerce platform system(s) 110, merchant system(s) 120, user system(s) 130, and third party system(s) 140 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides financial processing services to one or more merchants, such as to merchant system(s) 120 and/or user system(s) 130. For example, commerce platform system(s) 110 may manage merchant accounts held at the commerce platform, run financial transactions from user system(s) 130 performed on behalf of a merchant, clear transactions with third party system(s) 140 (e.g., credit card systems, banking systems, payment service systems, etc.), perform payouts to merchant and/or merchant agents, manage merchant and/or agent accounts held at the commerce platform system(s) 110, manage transfers between accounts established for different merchant system(s) 120, perform tax tracking and regulatory compliance services for one or more of the merchant system(s) 120 and/or user system(s) 130, as well as other services typically associated with commerce platforms systems such as, for example, STRIPE™.

In embodiments, commerce platform system(s) 110 therefore includes a plurality of service system(s) 110 that independently and collaboratively provide the various service offering discussed herein to merchant system(s) 120, user system(s) 130, and third party system(s) 140. Each of the service systems, in embodiments, is a distributed service system, such that one or more instances of each service system may be executed by distributed computing resources of the commerce platform system(s) 110.

Furthermore, each of the service system(s) 110 is implemented independently of the other service systems. That is, for example, each service system may have its own underlying execution in terms of programming language, execution environment, resources accessed and used, data formatting, timing constraints, etc. Therefore, determining proper operational health and proper function of each service system whether operating independently, and also collaboratively in which a service calls on or otherwise uses another service system, becomes increasingly complex. To exacerbate this complexity, commerce platform system(s), such as the one illustrated and described herein operate at a very large scale, on the order of millions to billions of transactions per day. Thus, the volume of operations creates a volume of data that is difficult to analyze to determine, for example, if a series of operations of a service system are properly executed with correct timing resulting in proper functioning of such a system. Additionally, determining aggregated analysis of such operational health is also challenging across systems (e.g., whether a plurality of services that perform charge clearance are all operating consistently), across attributes (e.g., whether charge clearance of all services using a same payment instrument types are operating consistently), and even within a single software system (e.g., a system that processes hundreds of thousand to billions of transactions a day).

Figures 3A, 3B, 3C:
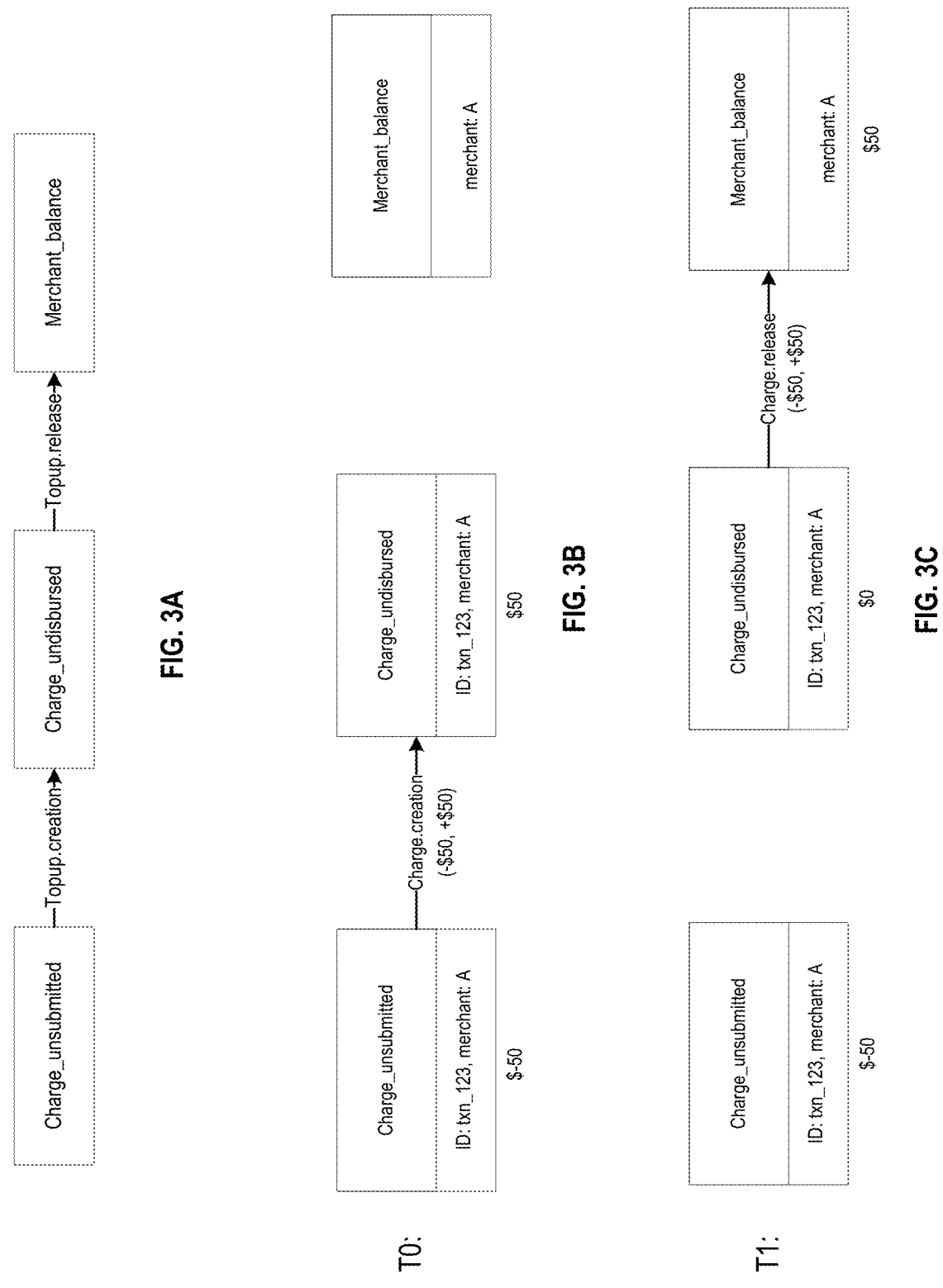
FIG. 3A is a block diagram of an example model of a software system as a state machine in a ledger system.
FIGS. 3B-3C are block diagrams of use of the ledger system state machine to clear software system operations to determine proper function and/or health of the software system.
Figure 3D:
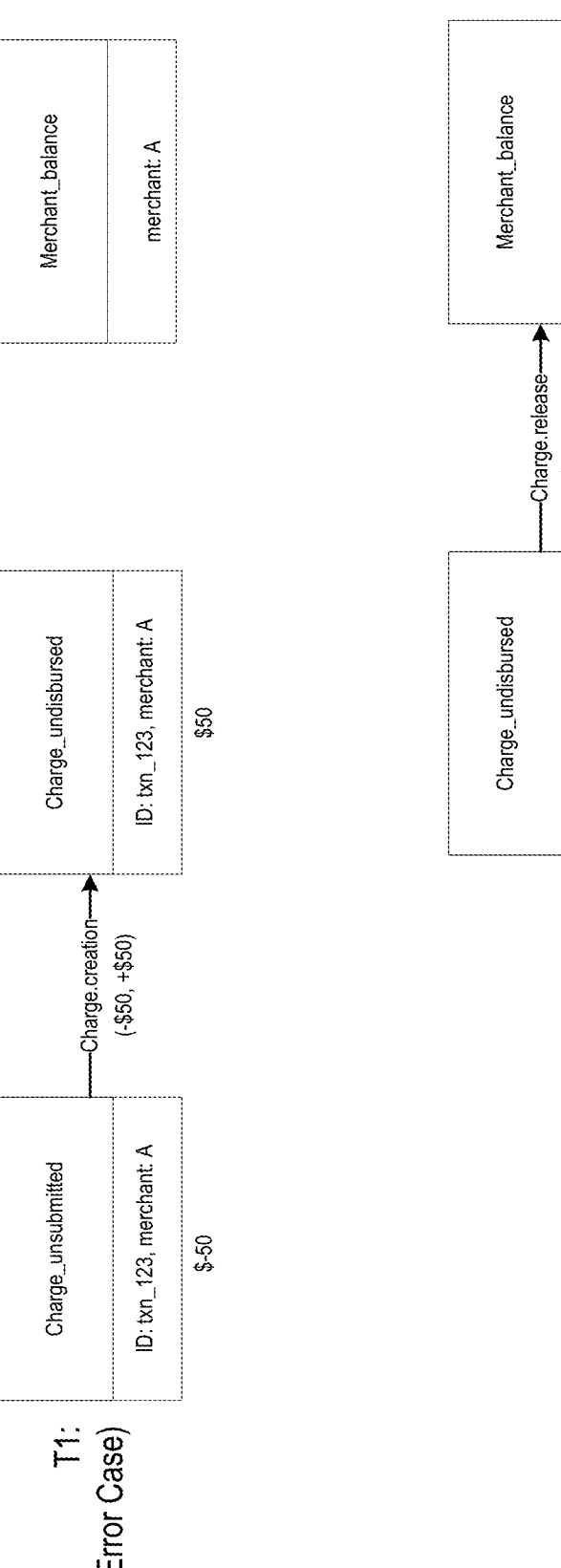
FIG. 3D is a block diagrams of use of the ledger system state machine to clear software system operations to determine lack of proper function and/or health of the software system.

In embodiments, commerce platform system(s) 110 includes a ledger system 115. In embodiments, ledger system 115 is an accounting system that implements a double accounting bookkeeping system. Such a bookkeeping system is one in which monetary data is neither created nor destroyed within the commerce platform system 110. For example, a system processing the transaction by creating a $50 charge in a first account of a first user will have to detect a corresponding −$50 charge in a second account of Merchant A resulting in a net balance of the transaction of $0. In other words, for the bookkeeping system to properly record the transaction details, the sub-transactions will have to create a zero balance. FIGS. 3B and 3C illustrate an example of this scenario where a charge creation subtracts an initial amount from a charge unsubmitted state associated with a merchant_A creating a $50 balance in a charge undisbursed state (see FIG. 3B). However, when the charge is released and a balance of $50 is deducted from a user's account and added to the merchant_A's balance, then the charge undisbursed state is updated to have a zero balance (see FIG. 3B). This zero balance in the charge undisbursed state is an expected value that serves as an indicator that the various transactions with this charge process are performed properly, and the clearing process performed by ledger system 115 detects this zero balance (or in cases in which a transaction is not performed properly detects a non-zero balance). Conversely, FIG. 3D illustrates an embodiment where when the charge is released, it is incorrectly released to a merchant_B account resulting in a non-zero balance in the charge undisbursed states for merchant A and merchant B. The non-zero balance is therefore an indication that the underlying software system made an incorrect action with respect to how its implementation (e.g., code) executed the charge operations, since each charge should have a matching deduction. In either scenario, however, ledger system 115 makes the determination of the proper functioning based on the balances within various states, including a state that should have a zero balance when a transaction clears, without knowledge of the actual implementation of the underlying software system. Thus, the ledger system's 115 process of determining proper functions of software systems is agnostic to underlying implementation, and may be employed to detect proper function to any software system as discussed herein. An embodiment of clearing transactions by tracing and determining account balances is discussed in U.S. patent application Ser. No. 16/938,686, titled "Systems and Methods for Transaction Tracing", filed on Jul. 20, 2020, and is incorporated herein in its entirety. Furthermore, embodiments of a system for maintaining consistency of a database of ledger transactions which may be used to store and access ledger events is discussed in U.S. Pat. No. 11,410,180, titled "Database with Dimensional Balances Updating", issued on Aug. 9, 2022, U.S. patent application Ser. No. 17/850,324, titled "Database with Dimensional Balances Updating", filed on Jun. 27, 2002, and U.S. patent application Ser. No. 17/095,552, titled "Database with Data Integrity Maintenance", filed on Nov. 11, 2020, each of which are incorporated by reference herein in their entireties.

In embodiments, as discussed in greater detail below, this zero balance is an indicator that the software system(s) (e.g., one or more of software system(s) 110 that participate in the example charge process) are functioning properly to create and release the charge. That is, in embodiments, transactions processed by service system(s) 110, which move money between accounts maintained by commerce platform system(s) 110, may record these money movements in ledger transaction data store 104. Ledger system 115 then periodically performs a clearing process on the stored transactions to determine whether certain transactions clear, and thus are executed properly.

In embodiments, ledger system 115 uses the clearing process to determine whether each of the software systems is functioning properly, with respect to the processes they perform. In embodiments, using the clearing process of the ledger system 115 as a mechanism, where transaction clearing represents proper execution of a process of a corresponding software system 110, enables the financial accounting ledger system 115 to perform process analysis of underlying software processes of the service system(s) 110 without knowledge of actual implementation details of such underlying software processes. The correlation of the ledger system's 115 data and clearing to underlying software systems of service system(s) 10 is discussed in greater detail below.

In embodiments, ledger transaction data store 104 stores ledger transaction messages generated by each service system 110 that report each service system performing various actions. As discussed herein, the ledger system 115 includes the ability to perform a clearing process that seeks to determine whether a transaction is associated with a zero balance. In embodiments, and as discussed in greater detail below, the behavior of each service system 110 is represented as a state machine by ledger system 115 such that states may be associated with actions and/or stages of a process executed by an underlying software system. Furthermore, each state may be associated with an expected dollar amount (e.g., actual dollar amount or a dollar amount that serves as a Boolean flag) during a transaction lifecycle. Finally, other actions or operations of a software system may represent transitions between states. Then, in embodiments, each of the service systems 110 is configured to generate ledger transaction messaging for storage in ledger transaction data store 104 to represent the performance of operations as states or transitions, thereby creating a consistent database of the actions taken by each software system.

In embodiments, any software system (e.g., any service, any implementation, etc.) of the distributed services of the commerce platform system 110 that moves data and is concerned about that, whether it is data representing actual money or data where money is symbolic of other actions, then ledger system will represent the service system's 110 behavior of system as a state machine. The state machines of each service system, representing expected behaviors and data operations of a service system, are encoded into ledger data models. Then, with the ledger transaction messages, and the expected operations and values defined by the data models, ledger system utilizes its double entry bookkeeping clearance process to determine proper service system functioning from the data within the reported service system messages, as will be discussed in greater detail below.

Furthermore, based on the clearing processes, for example with respect to a ledger data model for a specific service system 110 in view of that service systems messaging data stored in data store 104, ledger system 115 uses the clearing mechanism to detect proper service system functioning, as well as to make other health assessments at a transaction level, at a merchant system level, at other data levels (e.g., a card type, a bank type, processes interacting with a specific third party system, etc.).

In embodiments, the data model for each software system defines a state machine having states, labels and/or metadata associated with the states, and transitions including actions, data, etc. that will cause a movement between states. As discussed herein, each of the states, labels and/or metadata, and transitions are defined as software objects. Furthermore, the states may be configured to hold data including a dollar amount (e.g., representing actual money or representing a Boolean flag symbolic of money). Then, by accessing the objects in the data store 104, including the actual or symbolic dollar representations of actions, a clearing process based on the associated state machine can verify certain states as having a zero balance (e.g., a certain state_X has zero balance when a process is performed correctly), occurrence of operations (e.g., each of states 1, 2, and 3 have been performed), and/or timing of operations (e.g., state 2 was performed after state 1, and state 3 was performed either with or after state 2), to verify proper execution of a service system's associated process (e.g., FIG. 3A representing a state machine with states and transitions, and FIGS. 3B-3C representing the states and data for a given transaction at different times based on ledger transaction messaging). Therefore, based on the clearing results, for a transaction, a group of transactions, etc. ledger system 115 determines correct operation of a system (and where it may be failing, such as overall failure, failure in timing, failure at a certain state, etc.) based on the data in the ledger data store 140 and operation of the clearing mechanism executed by the ledger system 115 with respect to a corresponding state machine data model.

As discussed herein, ledger system 115 can determine the proper operation and health of each service system(s) 110, where the service systems can include any software system regardless of implementation or purpose. As discussed herein, the definition of a state machine with defined states, labels/metadata that at least define expected values within states, and transitions, then a ledger clearing mechanism detects when states do not have expected data, an expected transition between states has not occurred, a timing of events is incorrect, etc. to detect proper functioning (e.g., based on what is expected in view of the state machine compared to the ledger transaction data in data store 104.

Beneficially, each ledger data model or state machine for each service system is an abstraction of that service system's expected behavior (e.g., proper functioning), where actual or symbolic (e.g., boolean) money moves as intended and reaches the correct temporary and/or final destination accounts. Furthermore, by associating actual dollar amounts or symbolic/Boolean dollar amounts with states and identification/definition of certain states as zero balance states, then the state of the data in data store 104 can be analyzed and reconciled via the clearing process performed by ledger system 115 as a double entry bookkeeping system. When zero balances are found in one or more appropriate states, a process is determined to function as expected, and when a zero balance is not found in the appropriate states, the process is determined not to be functioning as expected. Therefore, even though ledger system 115 is not involved in the building, coding, design, or execution of the various service system(s) 110, ledger system 115 is able to detect both proper function and system health using the ledger system 115 clearing mechanism, and conversely identification of a breakdown of a service system including the specific state, timing or transition leading to the failure. The state, timing or transition, referred to as operational characteristics below, can then be correlated with the operation or data it represents to pinpoint an actual point of failure.

Furthermore, operational characteristics may be aggregated across transaction types, across service systems, for specific time periods, for a subset of transactions, across merchant systems, for a single merchant system, etc. as a snapshot or summary of service system health, process health, and/or overall commerce platform system 110 health. This analysis, as discussed herein is an abstracted analysis that can be carried out regardless of the underlying implementation of the service systems, therefore ensuring wide ranging applicability and an ability of ledger system 115 to integrate with any service system 110.

Figure 2:
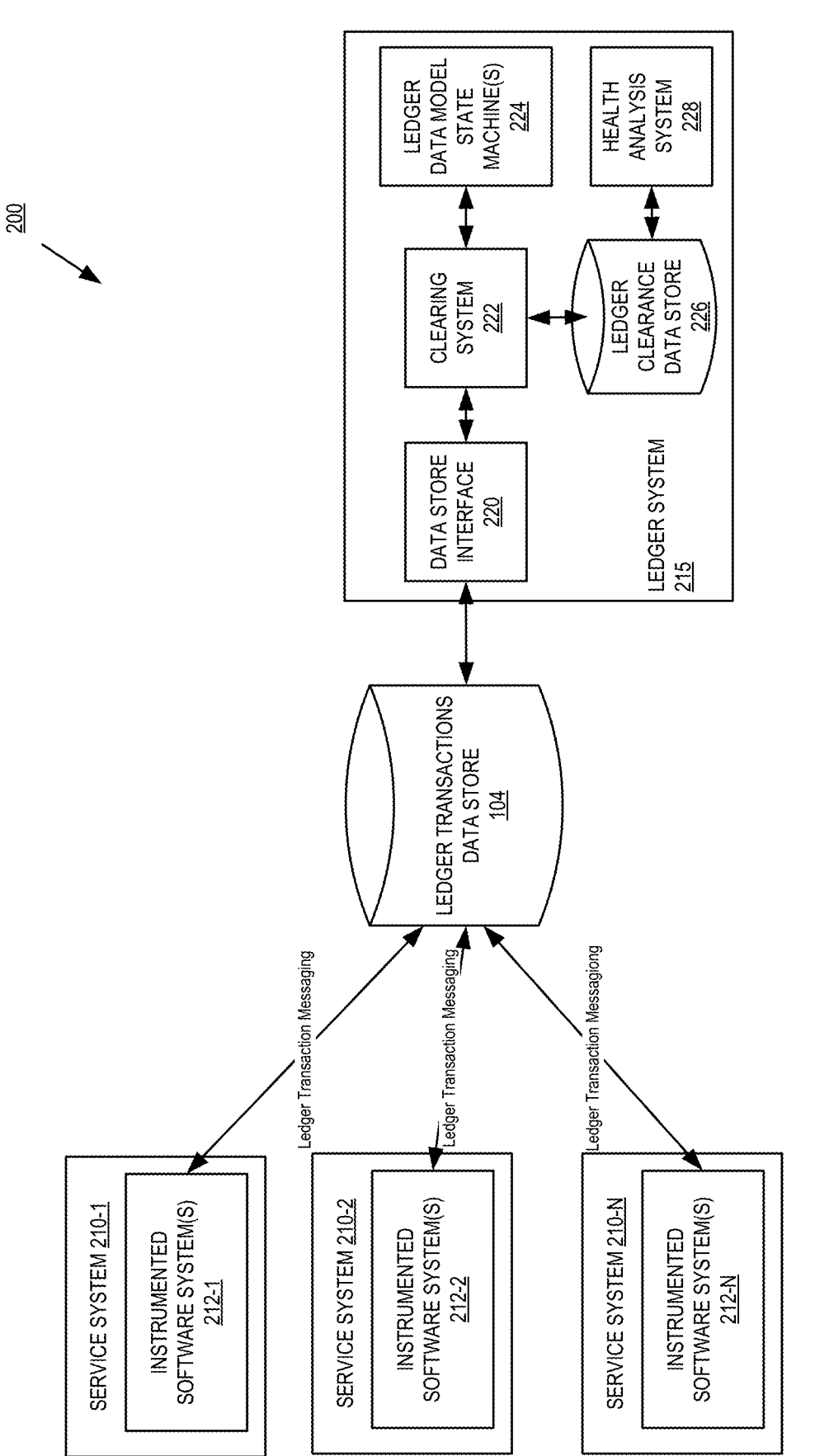
FIG. 2 illustrates a block diagram of one embodiment of distributed service systems and a ledger system for determining proper function and healthy operation of the software system.

FIG. 2 illustrates a block diagram of one embodiment of distributed service systems and a ledger system for determining proper function and healthy operation of software systems. The ledger system 215 and service systems 210-1, 210-2, and 210-N provide additional details for the ledger system 115 and service systems 110 discussed above in FIG. 1.

The distributed service systems include service system 210-1, 210-2, through 210-N as any number of service systems performing the operations discussed herein may utilize ledger system 215 to determine proper functioning of underlying and respective software system(s) 212-1, 212-2, through 210-N. In embodiments, as discussed herein, each of the service systems that moves money, such as physical money or symbolic money that represents other service system operations, is integrated with ledger system 215 through software system instrumentation enabling ledger transaction messaging and definition of a state machine that models the processes of the underlying software systems to the ledger system's clearing process. Each of these is discussed in greater detail below.

Figure 4:
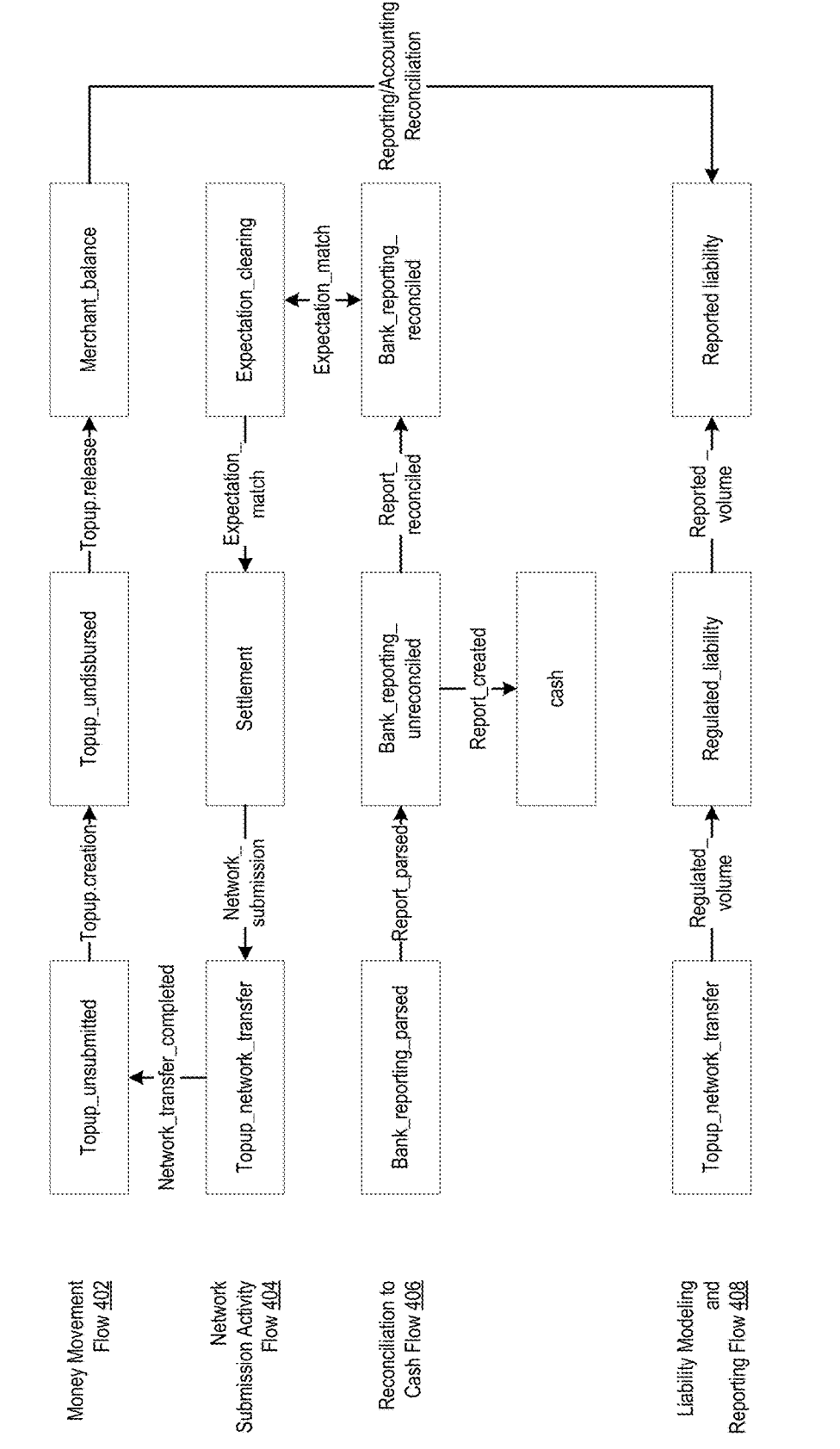
FIG. 4 is a block diagrams of another example model of a software system as a state machine in a ledger system.

In embodiments, ledger system 215 comprises ledger data model state machine(s) 224 having one or more state machines that model software system behavior of the service systems. Each data model defines at least two states, a set of one or more transitions, data within each state, and at least one state having an expected zero balance at the conclusion of proper execution of an underlying software process modeled by the state machine. For example, FIG. 3A illustrates a state machine defined for a software system that performs account topups (e.g., a system that performs operations to add monetary value to an account to maintain a desired amount in the account). The state machine has states charge_unsubmitted, charge_undisbursed, and merchant balance states in a data model of the topup processes flow state machine. Another example of a data model that includes a topup state machine process as part of a larger state machine is illustrated in FIG. 4. The state machine 400 is more complex in FIG. 4 because it includes the states and transitions for a money movement flow 402, a network submission activity flow 404, a reconciliation to cash flow 405, and a liability modeling and reporting flow 408, each of which are independent subflows with interconnections and exchanges between the flows. For example, the network submission flow 404 is an independent subflow of the state machine 400 and includes states for expectation clearing, settlement, and topup network transfer states, as well as the operations that cause transitions between states. Furthermore, network submission flow 404 feeds into the money movement flow 402 (e.g., the topup flow) via network transfer completed event. Similarly, the reconciliation to cash flow 406 and the network submission activity flow are connected via an expectation match event, and the liability modeling and reporting flow 408 is connected to the money movement flow 402 via the reporting/accounting reconciliation event. Each of these states, transitions, and interconnections are reported as event messages to the ledger transaction data store 104 as discussed herein, which enables the clearing processes discussed herein to not only detect correctness of a sub flow based on detection of a zero balance in a predefined state, but tracing to other related states that may contribute to an non-zero balance. For example, if topup_undisbursed state in the money movement flow 402 is not zero, the related flows 404 and 406 that are connected to the money movement flow 402 may also be checked to determine if they have a non-zero balance in an expected zero balance state after clearing, which may contribute the incorrectness detected in the money movement flow 402 . . . . Each of the flows 402, 404, 406, and 408 is therefore associated with respective states, state transitions between states of the same and/or different flow, and are also represented as a data model. The data model defines the states, transitions, and metadata or labels of each state (e.g., state name, expected values of states, timing, whether the state is a zero balance state, etc.) using, for example, a database model, XML, a Protobuf schema, or other modeling language. Furthermore, the state transition operations topup.creation and topup.release represent actions that cause transitions between states, as shown in FIG. 3.

In embodiments, the data model state machines stored by ledger system 215 are composed of three types of objects, including account objects, entry objects, and transaction objects. The data set generated by instrumented software system(s) 212 and transmitted to ledger transaction data store 104, as discussed below, is an unordered, append-only log of transaction records in data store 104. Ledger system 215, as discussed herein, is a system for recording financial activity at commerce platform system(s) 110. Financial activity is logged in data store 104 in the form of transactions, which add credit or debit entries from accounts.

In embodiments, a transaction object type is a set of an entry of data objects, which are committed to the log in ledger data store 104 as a unit. For example, the following schema may be used to represent a transaction:

```
class Transaction < T::Struct
    prop :id, String
    prop :created_at, Integer
    prop :effective_at, Integer
    prop :occurred_at, Integer
```

-continued

```
    prop :entries, T :: Array[Entry]
    prop :metadata, T::Hash[String, String]
end
```

Ledger system 215 uses clearing system 222 as a double-entry system, and the list of entry objects must therefore be even and balance. Take, for example, the state machine data model of FIG. 3A. The data populated into the states as shown in FIGS. 3B and 3C are added by a transaction object having an entry into each state, and also include identification data such as the merchant account identification data, a transaction identifier, and the type of entry (e.g., transition). In an embodiment, each namespace and currency combination is a distinct sub-ledger and must independently balance. Therefore, clearing system 222 takes the list of entries in data store 104, groups them by each entry's namespace and currency, and then sums the amounts in each group which must equal zero at one or more states, such as the charge undisbursed state as shown in FIG. 3C. This is an example of a clearing process performed by clearing system 222.

Furthermore, in embodiments, multiple timestamp fields may be included in the transaction object, which is UNIX or other timestamp for enabling the determination of timing of operations in transactions relative to one another. The created at field is a timestamp corresponding to when a transaction is constructed in memory of a software system, the effective timestamp indicates a time when a transaction is estimated to have actually occurred, and the occurred at timestamp indicates confirmation from another system of the transaction (e.g., a third party system 140).

In embodiments, the accounts data object is a data object at which ledger system 215 tracks balances. Each account object has three properties, including a namespace that identifies an account, a currency the account is denominated in, and a type that describes the account (e.g., which fields to expect).

In embodiments, the entry data objects are objects that define adjustments made to accounts. An embodiment representing an entry is:

```
class Entry < T::Struct
    prop :amount,
    String prop :account, T::Hash[String, String]
    prop :metadata, T::Hash[String, String]
end
```

The balance of the reference account is adjusted by the amount in the entry. That is, a positive amount increments the balance of the identified account, and a negative amount decrements it. In embodiments, the current balance of the account is not taken into account, and in some embodiments, it is acceptable for an entry to cause an account whose balance is ordinarily positive to go negative (or vice versa). Since accounts can only hold balances in one currency, the entry is implicitly denominated in the currency of its associated account.

With these objects, an example transaction can be represented by the following pseudocode:

```
{
    "id": "d659bf0d644eb3ac0d1f08-0-0987e6984",
    "created_at": 1524974072,
    "effective_at": 1524841370,
    "entries": [
```

11

-continued

```
{
  "amount": "80.1",
    "account": { "currency": "gbp", "id": "ch_0sgUdrL":
    "acct_QqE0s", "ns": "fbo.eu", "type": "charge_submitted" },
  "metadata": { }
  },
  {
  "amount": "-80.1",
  "account": { "currency": "gbp", "id": "ch_0sgUdrL",
  "merchant":
  "acct_QqE0s", "ns": "fbo.eu", "type": "charge_unsubmitted"} },
  "metadata": { }
  ],
  "metadata": { "clearing_request": "satts_1CLY62E0sgUdrLhGZ4j0et48",
    "git_revision": "2acd8641", "span_id": "680ad5ced1fad905",
    "subtarget": "ingsubtrg_CldH6deO0yNQ1F", "uid": "be83391a167a"
  }
}
```

In embodiments, each of the instrumented software system(s) 212-1, 212-2 and 212-N is referred to as instrumented because each is configured to generate ledger transaction messages, using the transaction, accounts, and entry objects to represent events occurring within the software system as transaction messages. In embodiments, the instrumentation includes execution of producer services, for example running in Ruby, Scala, Java, or other code bases, using a bookkeeper library to generate and transmit ledger objects that are transmitted or reported as ledger events to the ledger transactions data store 104. The events, for example, include events that move money among accounts. The events, additionally, include events that move symbolic money (e.g., Boolean flag monetary amounts) between accounts representing other actions of underlying software systems. As discussed herein, ledger system 215 may use its clearing mechanism to detect proper functioning of any movement of data, whether money or data movement represented symbolically by money amounts. Therefore, streams of transaction messages from each service system are transmitted to ledger transactions data store 104 during the operation of the software systems 212-1 through 212-N.

In embodiments, the ledger transaction messaging is not actual transaction performance messaging (e.g., a messaging causing a transaction, money movement, or other operation to occur), but instead messaging that records the occurrence of events in ledger transaction data store and performed by the service systems 210. The service systems 210 are responsible for actual performance of transactions, such as actually creating and clearing a charge with a banking network, moving data records, charging a recurring subscription services. However, ledger system 215 is able to detect proper functioning of the systems performing these operations, regardless of their implementation, as discussed herein. In embodiments, the state machine data models are created and stored to represent each software system's underlying behavior as funds flow (e.g., the flow associated with a corresponding state machine). Then the state machine, collected transaction messages in data store 104, and clearing system's 222 clearing process can make determinations on proper function of each software system, as well as aggregated across software systems, at a transaction level, or any other division of transaction type and transaction attributes, by determining a zero balance in one or more states associated with an expected zero balance (e.g., upon proper operation of a process).

In embodiments, clearing system 222 periodically performs a clearing process, such as hourly, daily, weekly, or at any other periodic interval to determine whether individual transactions have broken down and/or to detect overall system health of a commerce platform system, individual service systems, and specific processes of software systems. The clearing process, as discussed above, accesses the log of transaction messaging reported from software systems 212 and stored in ledger transaction data store 104. The messaging, when well formed, includes transaction data defined in transaction, account, and entry objects using the proper formatting and including the appropriate data. Clearing system 222 is then able to group transaction messages from the log in data store 226 via identifiers embedded within the messaging and sum account balances for individual transactions (e.g., actual transactions or symbolic transactions representative of non-monetary operations).

Clearing system 222 further loads one or more ledger data model state machines 224 that model underlying behavior of a software system, as discussed herein and as illustrated in FIGS. 3A-4. Clearing system uses the account identifiers, transaction identifiers, currency values, timing data, account balances at specific times, etc. to reconcile the data generated during the clearing process with states, values of states, and transitions between states of a respective ledger data model state machine for a given software system 212 of a service system 210.

For example, during periodic clearing processes performed by clearing system 222, FIG. 3B illustrates results of a clearing process for a transaction (e.g., txn_123 associated with Merchant A) at time TO with respect to the state machine in FIG. 3A. The state machine models the underlying behavior and shows the creation of a charge and the balances in accounts associated with merchant A at the charge unsubmitted state and charge undisbursed state, as transactions are committed in pairs. In embodiments, while account types may be shared by a plurality of merchants, the accounts referenced in the instances of the state machine in FIGS. 3A-3C are accounts associated with Merchant A. These states and the data within the states are formed by the reported ledger messaging. Then, at time T1, the charge release event further moves monetary values between accounts associated with Merchant A, zeroing out the balance in the charge undisbursed state and adding a balance to the merchant balance state. In embodiment, clearing system 222 stores the clearance data in ledger clearance data store so that later computation on a same transaction can access precomputed data. However, in some embodiments, only clearing results (e.g., detection of a zero balance as illustrated in FIG. 3C or a non-zero balance as illustrated in FIG. 3D) are recorded to ledger clearance data store 226.

Although the above examples are in terms of a transaction clearance or topup, which involves money movements between accounts. The present embodiments may be used to model any software system behavior as a funds flow, and thus utilize the clearing techniques to detect proper system function. For example, contract execution can be represented as a funds flow where contract origination, contract review, and contract execution are states with monetary values and a certain state (e.g., contract execution) having an expected zero balance when the states are executed properly in a proper order and with proper timing. Furthermore, the non-monetary operation may form a new state machine data model, or re-use an existing monetary model (e.g., a contract formation process may be modeled using the topup state machines of FIG. 3A or 4). As another example, a software system that checks for data coherence across database may be represented as a funds flow where the states include receiving a data access check, location of a set of records, and confirming data coherency of the records.

In embodiments, therefore, regardless of the actual operations, or implementation, of an underlying process of a software system, ledger system's 112 clearing system 222 is able to analyze the funds flow, and with a correspondingly defined ledger data model state machine, can detect where specific processes break down (e.g., at failed states, timing mismatches, etc.) based on the clearing operations performed periodically over time.

Furthermore, each event in a state machine is independent of other states. That is, the ledger transaction messaging indicates event occurrence within a software system and the data (e.g., identifiers, metadata, balances, accounts, etc.), which is independent of other messages and states. Then, clearing system 222 computes or otherwise seeks to sum balance with respect to states of a state machine. Thus, errors detectable within state(s) (e.g., occurring out of an expected order, detecting a predetermined state failing to have a zero balance as shown in the example of FIG. 3D, having a value outside of an expected range, occurring outside of an expected time with respect to another state, etc.) are independent. Thus, each error is independently detectable during the clearing process performed by clearing system 222, and enables clearing system 222 to not only detect software system malfunctions, but beneficially pinpoint where in a flow the software system breaks down. For example, over time, a transaction may indicate that a charge was released before it was created, which is indicative of an error in an underlying software system responsible for implementing the charge process.

In embodiments, health analysis system 228 may then access the ledger clearance data store 226 to generate one or more notifications when an error in a software system is detected. For example, an email message, a text message, or other message may be generated and transmitted to a user system associated with the service system and/or underlying software system for which the error was detected. This is an example of transaction level error detection for an individual transaction, which can pinpoint errors at scale and with a high degree of accuracy. However, since data store 226 stores clearing results for a plurality of transactions over time, health analysis system 228 further aggregates clearing results to perform trend analysis (e.g., determining when recent transaction(s) deviate from expected time to complete a transaction, expected transaction volume, expected transaction amount, etc.), generates aggregated results (e.g., 99.9% of transaction clear within 1 day), generates aggregated results across one or more filters (e.g., aggregated results associated with a third party system, a specific payment instrument, a country of origin, etc.). In embodiments, the health analysis system 228 may implement one or more statistical analysis techniques, such as forecasting, deviation analysis, expected value generation and comparison, etc. to detect and summarize data associated with proper operation of software systems. These results may then be sent via notification, or generated within a graphical user interface (such as that illustrated in FIGS. 6B and 6C), to a user system. Further, in embodiments, these filters, options, thresholds that enable alerting, etc. are configurable by a user system, such as through the graphical user interface noted above enabling a responsible user insight into underlying software system health, and the ability to drill down and isolate different execution scenarios.

Furthermore, as noted herein, the transactions and funds flows not only represent monetary transactions, but can symbolically represent other non-monetary processes which are modeled using a funds flow. Therefore, any software system's health, proper function, and thus operational characteristics can be analyzed as a modeled funds flow using a bookkeeping clearing system, as discussed herein.

FIG. 5 is a flow diagram of one embodiment of a method for modeling a software system by a ledger system for determining proper function of the software system. The method 500 is performed by processing logic that may comprise hardware (circuitry, dedicated logic, etc.), software (such as is run on a general purpose computer system or a dedicated machine), firmware, or a combination. In one embodiment, the method 500 is performed by a ledger system of a commerce platform system (e.g., ledger system 115 or 215).

Referring to FIG. 5, processing logic begins by receiving, by a messaging interface of a ledger system, a stream of ledger transaction messages generated during execution of the software system by the distributed services system, each ledger transaction message stored in a data store coupled with the ledger system (processing block 502). The ledger transaction messages, as discussed herein, include transaction, event and account objects that indicate occurrence of events, identifiers, currency, an amount of the event, account identifiers that are to receive or have a deduction from the account, etc. The messages are written to an append only log in a ledge transactions data store 104. Furthermore, the objects are objects defined by the ledger system, but any software system that is able to generate transaction messages conforming to the object definitions can stream transactions messages to the data store. Furthermore, as discussed throughout this application, the dollar amounts in the transaction messages can be actual dollar amounts representing the movement of physical or logical money. However, the dollar amounts may be symbolic or Boolean that represent the occurrence of a process at a software system executing software that does not necessarily move money around. Thus, the transaction messaging enables any software system to integrate with, and have a ledger system perform an analysis of health of the underlying software system processes, as discussed herein.

Processing logic further access, by the ledger system, a ledger data model comprising a state machine that models: a plurality of states of the software system and a plurality of events that cause a transition between two states of the state machine of the ledger data model (processing block 504). As discussed herein, the state machine models underlying processes of a software system as a funds flows, regardless of whether an actual or symbolic funds flow is being modeled. The states may further be associated with data values, such as expected values, expected timing characteristics, identification of states expected to have a zero balance after clearing, etc. Furthermore, transitions define the operations that are to occur with respect to later states, and can create an order of operations expected during proper functioning of an underlying software system. The state machine, however, is an abstraction of the process performed by the underlying software system, which is represented as a funds flow regardless of the actual implementation of the underlying software system.

Processing logic processes, by the ledger system, a ledger clearance operation using data associated with one or more of the received ledger transaction messages in the stream of ledger transaction messages for one or more states of the state machine of the ledger data model to generate monetary balances for the one or more states in the ledger data model (processing block 506). The clearing is performed by processing logic on a periodic basis, such as hourly, daily, weekly, etc., and as discussed herein, include accessing the log of transaction messaging records, such as those streamed to data store in processing block 504. Then, records for transactions may be grouped (e.g., by a combination of one or more of transaction id, merchant ID, timing information, etc.), and balance computed for accounts. The balances, operations, and other identification data may then be reconciled with a state machine for the software system being analyzed.

Processing logic then detects, by the ledger system, an operational characteristic of the software system based on a balance for at least one of the one or more states of the state machine of the ledger data model determined by the ledger clearance operation (processing block 508). In embodiments, the operational characteristic may be whether or not the underlying process(es) executed by the software system are functioning properly (e.g., a zero balance is detected at a specific state in which a zero balance is expected), or are functioning in an unexpected manner (e.g., a non-zero balance is detected at the specific state). Furthermore, where states are associated with other configuration options, such as timing information or order of execution information of states, expected time to reach zero balance (e.g. relative to initiation of a transaction), etc. the operational characteristic being determined may also include a determination by processing logic based on the data obtained during the clearing process and associated with the states in the state machine to detect further indicators of proper function of the software system. For example, even when a zero balance in an expected state is detected, the operational characteristics relating to event timing, transaction completion duration, proper operation sequencing, etc. can also be determined by processing logic based on the data within the states of the state machine data model.

Processing logic then generates and transmits, to a user system associated with the software system, a message that comprises the detected operational characteristic of the software system as an indication of proper functioning of the software system (processing block 510). The message can inform a user, such as one or more of a manager, developer, or other personnel as to when errors are detected in a software system for which the user is responsible for within the commerce platform system. The message may be a message directed to the user, such as an email message, an instant message, a multimedia message, a text message, etc. In some embodiments, the message is a graphical user interface populated with the operational characteristic data and rendered on a user's computing system. In either scenario, a highly accurate analysis can be performed at a transaction level, and at scale, to detect proper functioning of any software system, and alert a user system of this information.

Additionally, based on the periodic interval at which clearing is performed, notification of errors or lack of proper/expected function of a software system can greatly reduce proliferation of those errors into future transaction by pinpointing a source of a breakdown (e.g., a process or event of a software system that is mapped or associated with a state in the state machine where an error is detected) in real time or near real time as service systems execute their underlying software systems. Processing logic quickly disseminates error identification and likely source of the error to responsible users to both identify and enable rectification in real time and in response to newly arising errors.

FIG. 6A is a block diagram 600 of a health analysis system 628 of a ledger system for performing health analysis of a modeled software system. The health analysis system 628 is executable within a ledger system (e.g., ledger system 215 or 115), and health analysis system 628 provides additional details for the health analysis system 228 discussed above.

As discussed above, a ledger system (e.g., ledger system 215 or 115) utilizes a state machine data model that correlates software system behavior with money movements, such money movements correlating with software system behavior that performs actual money movements or symbolic money movement that is representative of other actions of a software system. When the software systems faithfully report those money movements as ledger transaction messages, the ledger system (e.g., ledger system 215 or 115) is able to use a double accounting bookkeeping clearing process to detect when the money movements, and thus the underlying software system behavior is or is not functioning as expected. For example, for a process that clears a transaction and faithfully reports event occurrence via transaction messaging to ledger system (e.g., ledger system 215 or 115), ledger system may detect one or more expected zero balance states of a corresponding state machine data model, and the ledger systems bookkeeping clearing process accordingly detects whether each individual transaction clears as expected (e.g., FIG. 3C), fails to clear (e.g., FIG. 3D), clears within an expected time period, clears after an expected time period, and when an error occurs exactly where the error occurred within the process. As another example, a database operation that writes three database entries may represent operations in the database write process, and thus correlate corresponding states of a state machine data model write process, with monetary amounts including one or more zero balance states indicative of a successful database write execution. Then, the ledger system, assuming faithful and accurate reporting of events, is again able to use its double entry bookkeeping clearing process to detect, from the events, whether the expected states have a zero balance (e.g., the database process executed as expected) or have one or more non-zero balances (e.g., an error occurred in the database process executed by the software system) and exactly which state failed to be executed properly).

To avoid obscuring the techniques employed by the analysis system, the below discussion will use the clearance of transactions as an example of an analysis performed, but as discussed herein the analysis performed by the health analysis system 628 may be performed for any software process utilizing the modeling and messaging discussed herein.

In embodiments, health analysis system 628 aggregates results of a set of clearing processes to determine overall health of an individual software system, of a set of similar processes (e.g., clearing processes performed by different software systems), overall health of a commerce platform system (e.g., commerce platform system 110), as well as other slices of operational health of the commerce platform system. Analysis engine 634 utilizes a ledger data store interface 630 to access a ledger clearance data store (e.g., data store 226), such as by generating record requests from the ledger clearance data store. In embodiments, analysis engine 634 performs this data access of the ledger clearance data store periodically (e.g., hourly, daily, weekly, etc.), as well as on-demand at the request of a user system, as discussed below. For example, for an aggregated analysis of a set of ledger data store clearance records (e.g., indicative of determinations of whether or not individual software system processes were or were not performed correctly), analysis engine 634 gathers a subset of such records, such as all records for prior week, a prior day, etc., all records associated with a specific merchant, all records for a software system, or records associated with any other filters (e.g., third party system, card brand, bank, payment instrument type such as linked digital wallet payment type, credit card type, cash, etc.).

In an embodiment, health analysis system 628 includes a user interface manager 632. User interface manager 632 is responsible for generating and managing one or more graphical user interfaces that present health analysis results to an end user system, such as via a dashboard user interface, a web page, charts rendered within an application, etc. Furthermore, user interface manager 632 is also responsible for generating and managing one or more interfaces enabling the end user system the ability to configure an analysis performed by the analysis engine 634. For example, a user may set a period of an analysis (e.g., start and/or end time) performed by the analysis engine, one or more thresholds (e.g., alerting thresholds such as clearance rates dropping below X, thresholds indicative of expected operation duration such as clearance occurring within 7 days, as well as other thresholds), one or more filters to limit analysis to a filtered set of transactions (e.g., merchant filters, card brand filters, payment method filters, country of origin or destination filters, etc.), as well as other factors that define and can limit which transactions are obtained and analyzed. In an embodiment, the selection, toggling, adjustment may be performed via the user interface(s) served to a user system and via user selection received via the user interface(s). In embodiments, the number of transactions, and thus ledger transaction messages, may include a large scale of messages (e.g., billions per day), and thus these filters, time periods, thresholds enable a user system to obtain a desired analysis result, and to sift through the large number of potential records. These configurations on which records analysis should be done, what thresholds to use, how to filter records, start and end times or periods of analysis, etc. are stored in configuration settings data store 636.

However, in some embodiments, overall system health statistics, such as overall commerce platform system health (e.g., across all software systems), overall software system health (e.g., across all merchants, account types, payment methods, etc.), as well as other analysis may also be performed as defaults analysis operations. In embodiments, these default configurations are also stored in data store 636. The lack of configuration settings and/or use of default settings is also maintained in data store 636.

In embodiments, analysis engine 634 therefore accesses the configuration settings in data store 636 when executing one or more statistical, heuristic, or other analysis techniques on the obtained records (e.g. whether a subset of records, filtered records, all records, etc.) of values of the operational states (e.g., proper or improper function, which states fail to operate correctly, etc.) of a software system or across software systems. Analysis engine 634 then aggregates values of those operational states, such as values of expected zero balance states to determine when the processes (e.g., properly clearing a transaction) are being executed correctly by one or more software systems. For example, configuration settings may be set to determine whether a cleaning process executed by a software system is generating clearances within a 7-day period. The clearance values (e.g., expected zero balance states) are used to aggregate results across all clearance processes performed by the software system to detect, for example, how many transactions processed by the software system cleared within the expected clearance range of 0-7 days, how many cleared outside of the expected 7-day range, a sum of which days transactions cleared on, etc. The results may then be rendered, via user interface manager 632 to a user system.

Figure 6B:
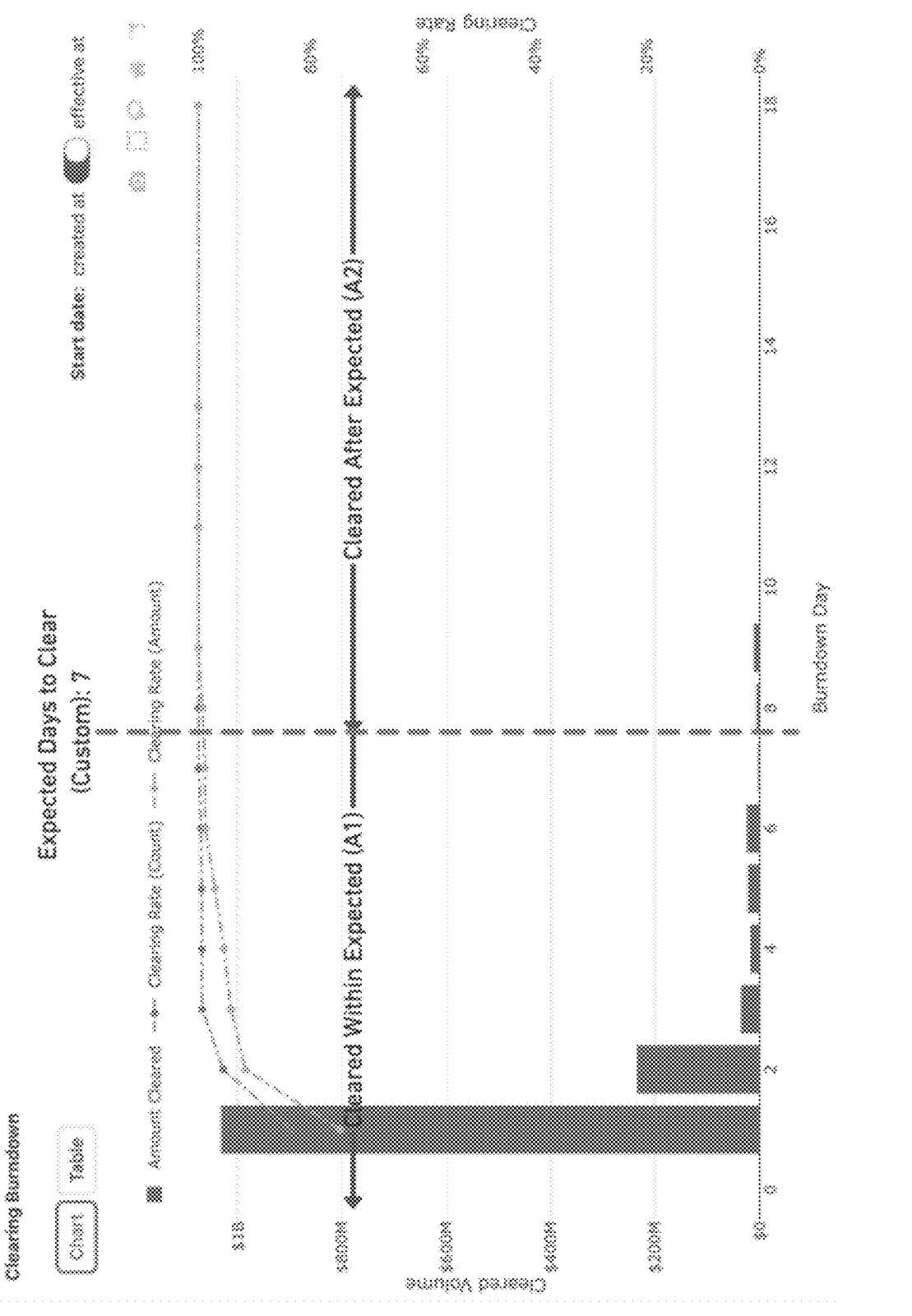
FIGS. 6B and 6C are example graphical user interfaces generated by a health analysis system.

FIG. 6B is an illustrative example of such a user interface that details the clearing process performed by the software system. As shown in the FIG. 6B, there are some transactions that cleared after the 7-day period, and for these transactions, the analysis engine 634 can pinpoint a bottleneck, error state, etc. using the techniques discussed above (e.g., state machine analysis to detect the states, and thus the underlying software system process(es) contributing to that state, causing a delay, clearance failure, etc.). Thus, if the analysis were to determine a large percentage of transactions clearing after the expected time period, then one or more alerts could be generated, the user interface rendered to alert a user, and the pinpointing of which functions of a software process are failing. The health analysis graphical user interface of FIG. 6B renders an easily interpretable summary of the operational health of a software system as performing, or not performing, within an expected set of configuration parameters. Furthermore, as illustrated in FIG. 6B, the type of rendering (e.g., chart or table), whether the user of a created at or effective at time is used as the basis for setting a time period parameter, etc. can be toggled within the graphical user interface enabling a user system to obtain additional renderings to improve the comprehension of the analysis results.

Figure 6C:
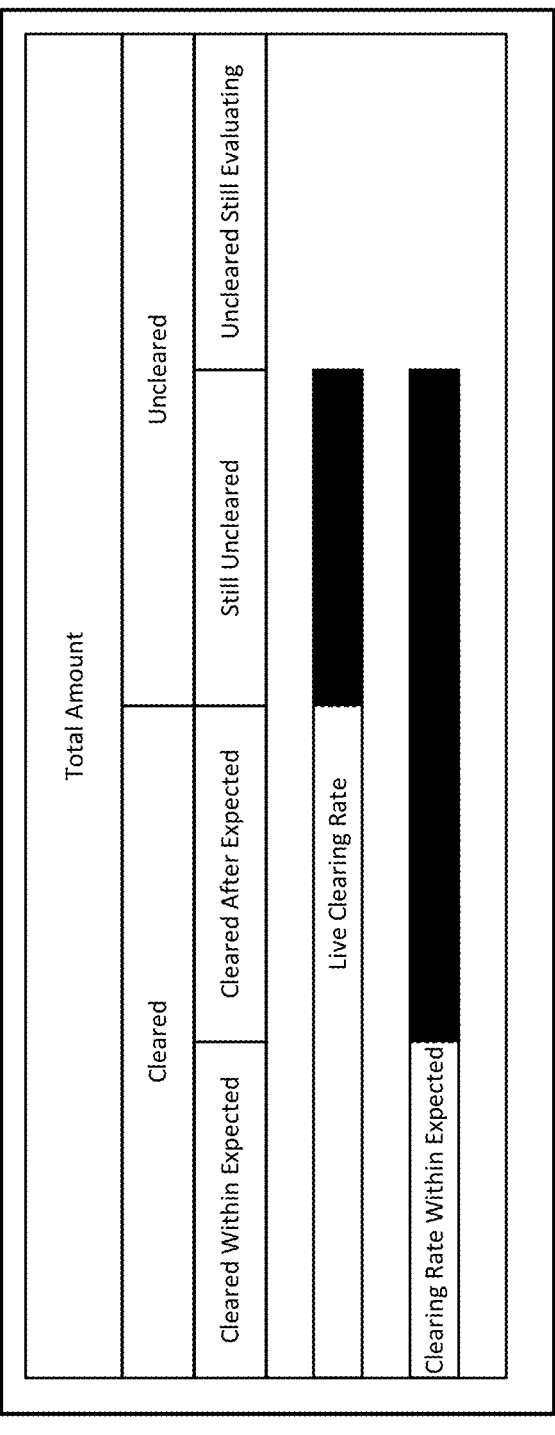

Another example of a graphical user interface showing health analysis generated by analysis engine 634 and rendered by user interface manager 632 is illustrated in FIG. 6C. FIG. 6C illustrate a comprehensive graphic, e.g., of all transactions of a commerce platform system, breaking the aggregated transactions into categories to show, for example, overall how many transactions have cleared vs not cleared, the status with respect to an expected time of clearance, transactions that do not clear (e.g., are still uncleared), and transactions still being evaluated. Furthermore, the results may be "live" in the sense that the periodic analysis performed by analysis engine 634 and rendered by user interface manager 632 may be performed at various periodic intervals (e.g., every minute, every quarter hour, every hour, etc.) or on demand to show most recent data analysis results.

Graphical user interfaces, such as that illustrated in FIGS. 6B and 6C, enable graphical representation of analysis results that reason on aggregated statistics for clearing states (e.g., proper execution), as well as timing of events occurring (when created, when reported to a ledger, etc.). Furthermore, continued periodic analysis by analysis engine 634 enables analysis engine to user the periodic analysis result to establish historical patterns (e.g., historical clearance rates, historical transaction volumes, historical arrival patters, etc. for service systems, across service systems, or other data subsets (e.g., filtered by configuration settings). For example, patterns may be established and analyzed via the configurable settings in data store 636, such as service system A historically generates X events per day, and only seeing Y events over the last Z days for service system A may be an indicator of an issue, bug, or other error in an underlying software system. Then, using the state machine data model analysis techniques to pinpoint certain software processes not operating as expected within service system A, then the potential source or cause of the issue, bug, or other error may be quickly identified and remedied.

Therefore, health analysis system 628 provides analysis techniques that provide real time analysis and health indicators of underlying software systems integrated with a ledger system. Furthermore, the analysis may be configured by a user system to provide specific and accurate analysis of subsets of transactions (e.g., executions of an underlying software system) to enable very specific and accurate analysis. Additionally, the analysis may run periodically within user intervention and based on set configuration settings so that alerting (e.g., error detection and potential source processes) may be generated by the analysis engine 634 automatically to proactively surface problems and alert responsible parties (e.g., user managers, engineers, etc.) of the surfaced problems.

FIG. 7 is a flow diagram of one embodiment of a method for modeling a software system by a ledger system for determining proper function of the software system. The method 700 is performed by processing logic that may comprise hardware (circuitry, dedicated logic, etc.), software (such as is run on a general purpose computer system or a dedicated machine), firmware, or a combination. In one embodiment, the method 500 is performed by a ledger system having a health analysis system (e.g., ledger system 115 or 215).

Referring to FIG. 7, processing logic begins by receiving, by a messaging interface of a ledger system, a stream of ledger transaction messages generated during execution of the software system by the distributed services system, each ledger transaction message stored in a data store coupled with the ledger system, and the stream comprising ledger transaction messages for a plurality of transactions performed by the software system (processing block 702), and accessing, by the ledger system, a ledger data model comprising a state machine that models: a plurality of states of the software system and a plurality of events that cause a transition between two states of the state machine of the ledger data model (processing block 704). Processing blocks 702 and 704 are performed similarly to processing blocks 502 and 504 discussed in greater detail above.

Processing logic then processes, by the ledger system, a ledger clearance operation with data from a subset of the received ledger transaction messages for states of the state machine of the ledger data model to generate monetary balances of states in the data model (processing bloc 506). The subset of received ledger transaction messages may correspond with a filtered set of transactions predefined or defined by a user system as configuration settings. The subset of transactions enable an analysis to be performed and results aggregated across the subset of transactions corresponding to the filtering and/or configuration options. In some embodiments, the subset is a reduced set of transactions (e.g., reduced based on the filters and configuration options to specific merchant(s), specific payment types, specific time periods, etc.). In other embodiments, the filters and/or configuration operations define all transactions (e.g., across all merchants, all payment types, etc.). Therefore, configuration of the subset enables a high degree of flexibility in the analysis of transactions, and thus the proper functioning of the underlying software systems and processes performing those transactions. Furthermore, the processing at block 706 may be periodic (e.g., hourly, daily, weekly, etc.), as well as on-demand in response to a user system request.

Processing logic generates, by the ledger system, values of operational characteristics of the software system based on an aggregation of balances for each state of the state machine of the ledger data model determined by the ledger clearance operation over the subset of the received ledger transaction messages (processing block 708). The values of the operational characteristics include data such as whether expected zero balance states do indeed have a zero balance, a timing associated with reaching or not reaching the zero balance, proper ordered operation of states, etc. These values may then be aggregated across the subset of transactions for analysis purposes, such as determining an overall indicator of whether the operational characteristic is associated with proper functioning of a software system, as compared to an error of the software system. Continuing the example discussed above, transaction clearance rate within an expected time period can be determined across all service systems' underlying software systems, for a specific service system, for specific transaction subsets (e.g., by merchant, a subset of merchants, payment type, third party system, card brand, etc.).

Processing logic then causes a display of, by the ledger system, a user interface that displays the values of the operational characteristics of the software system aggregated over the subset of the received ledger transaction messages (processing block 710). The user interface is a graphical depiction of the analysis results, for example as illustrated in FIGS. 6B and 6C, and is transmitted to a user computer system causing the user's system to render a display of the graphical user interface. The user interface therefore provides a fast and efficient visual representation of the operational health, such as whether or not an underlying software system's clearance rate is functioning within one or more expected parameters. Beneficially, deviation for the expected parameters may be quickly identified and used to surface the source of those issues, as discussed herein.

Additionally, the health analysis is based on transaction message reporting, which can report actual money movements or symbolic/Boolean money movements tied to underlying software system processed via a state machine data model, so that a double entry bookkeeping clearance process can use the money movement transaction messaging to "clear" the transactions to detect one or more zero balances states. However, the state machine data model is an abstraction of the underlying systems expected behaviors, and thus the health analysis generates an analysis of the underling behavior. Because of the abstracted nature of the operation of a software system, any system regardless of function, operation, implementation, etc. is able to be modeled and its operational health analyzed, at scale and with a high degree of accuracy, according to the techniques discussed herein.

Figure 8:
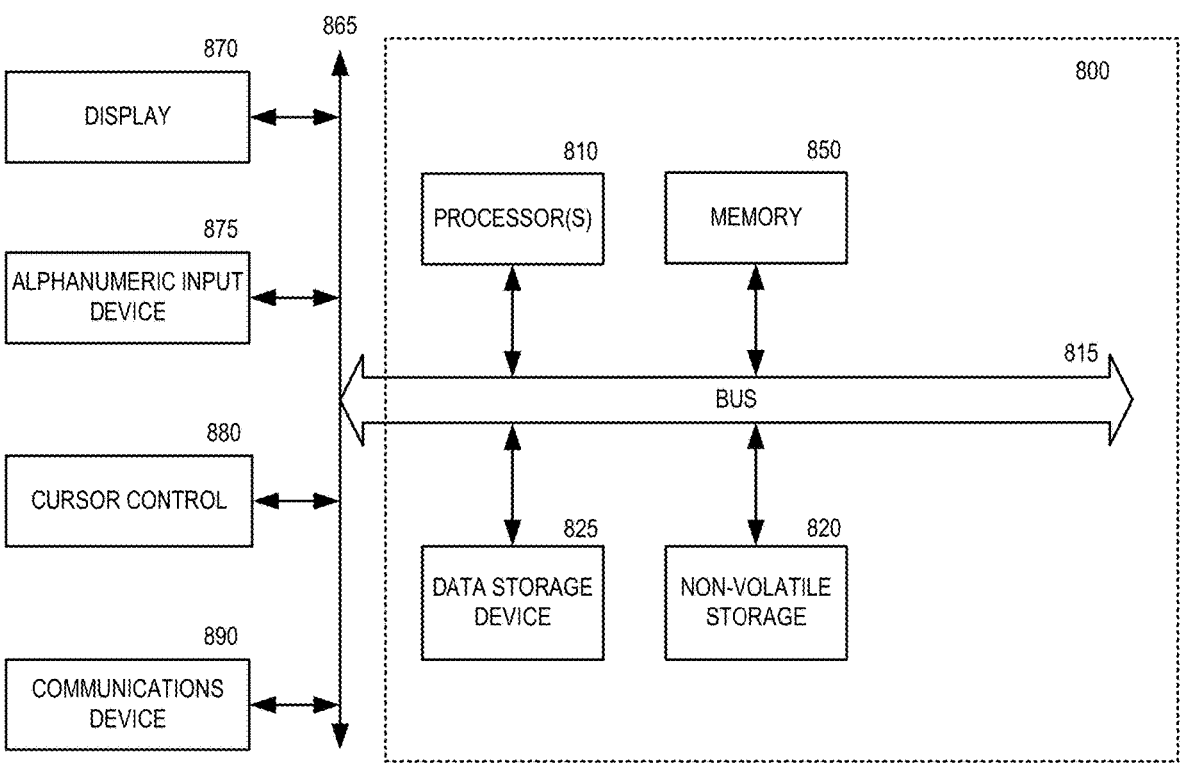
FIG. 8 is one embodiment of a computer system that may be used to support the systems and operations discussed herein.

FIG. 8 is one embodiment of a computer system that may be used to support the systems and operations discussed herein. For example, the computer system illustrated in FIG. 8 may be used by a commerce platform system, a merchant development system, merchant user system, etc. It will be apparent to those of ordinary skill in the art, however that other alternative systems of various system architectures may also be used.

The data processing system illustrated in FIG. 8 includes a bus or other internal communication means 815 for communicating information, and one or more processor(s) 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a light emitting diode (LED) display or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a touchpad, mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The embodiments discussed herein may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A computer-implemented method for modeling a software system of a distributed services system, comprising:

receiving, by a messaging interface of a ledger system, a stream of ledger transaction messages generated during execution of the software system by the distributed services system;

processing, by the ledger system, a ledger clearance operation using data associated with one or more of the received ledger transaction messages in to generate a balance for one or more states of a state machine, wherein the state machine is comprised within a ledger data model of the ledger system, and configured to model one or more processes of the software system via the one or more states;

detecting, by the ledger system, an operational characteristic of the software system based on the balance, wherein the detected operational characteristic conveys whether the software system is operating as expected or not as expected; and causing display of, by the ledger system, a graphical user interface (GUI), that displays values of the detected operational characteristic that convey a functional status of the software system.

2. The computer-implemented method of claim 1, further comprising:

transmitting, to a user system associated with the software system, a message that conveys the functional status of the software system.

3. The computer-implemented method of claim 1, wherein the state machine maps the one or more processes of the software system to one or more money movements between accounts that are reported via the stream of ledger transaction messages.

4. The computer-implemented method of claim 1, further comprising:

determining whether the balance for the one or more states is zero or not zero, wherein a determination that the balance is not zero indicates that the software system is not operating as expected and a determination that the balance is zero indicates that the software system is operating as expected.

5. The computer-implemented method of claim 4, further comprising:

in response to determining that the balance for the one or more states is not zero, determining that a value associated with the one or more states is different from an expected predefined value; and identifying one or more operations associated with the value.

6. The computer-implemented method of claim 3, wherein the software system moves money between accounts maintained by the distributed service system.

7. The computer-implemented method of claim 3, wherein the state machine defines an expected balance at a predetermined period, the expected balance of being associated with proper functioning of the software system.

8. The computer-implemented method of claim 1, wherein each ledger transaction message of the stream of ledger transaction messages generated during execution of the software system is associated with an event processed by the software system.

9. A non-transitory computer readable storage medium, having instructions stored thereon, which when executed by a computer processing system, cause the computer processing system to perform operations for modeling a software system of a distributed services system, comprising:

receiving, by a messaging interface of a ledger system, a stream of ledger transaction messages generated during execution of the software system by the distributed services system;

processing, by the ledger system, a ledger clearance operation using data associated with one or more of the received ledger transaction messages to generate a balance for one or more states of a state machine, the state machine comprised within a ledger data model of the ledger system and configured to model one or more processes of the software system via the one or more states;

detecting, by the ledger system, an operational characteristic of the software system based on the balance, wherein the detected operational characteristic conveys whether the software system is operating as expected or not as expected; and causing display of, by the ledger system, a graphical user interface (GUI), that displays values of the detected operational characteristic that convey a functional status of the software system.

10. The non-transitory computer readable storage medium of claim 9, further comprising:

generating and transmitting, to a user system associated with the software system, a message that comprises the detected operational characteristic of the software system as an indication of proper or improper functioning of the software system conveys the functional status of the software system.

11. The non-transitory computer readable storage medium of claim 9, wherein the state machine maps the one or more processes of the software system to one or more money movements between accounts that are reported via the stream of ledger transaction messages.

12. The non-transitory computer readable storage medium of claim 11, further comprising:

determining whether the balance for the one or more states is zero or not zero, wherein a determination that the balance is not zero indicates that the software system is not operating as expected and a determination that the balance is zero indicates that the software system is operating as expected.

13. The non-transitory computer readable storage medium of claim 12, further comprising:

in response to determining that the balance for the one or more states is not zero, determining that a value associated with the one or more states is different from an expected predefined value; and identifying one or more operations associated with the value as a reason that the software system is not operating as expected.

14. A system, comprising: a memory having instructions stored thereon; and a processing system coupled with the memory, configured to execute the instructions causing the processing system to perform operations for modeling a software system of a distributed services system, comprising:

receiving, by a messaging interface of a ledger system, a stream of ledger transaction messages generated during execution of the software system by the distributed services system;

processing, by the ledger system, a ledger clearance operation using data associated with one or more of the received ledger transaction messages to generate a balance for one or more states of a state machine, the state machine comprised within a ledger data model of the ledger system and configured to model one or more processes of the software system via the one or more states;

detecting, by the ledger system, an operational characteristic of the software system based on the balance, wherein the detected operational characteristic conveys whether the software system is operating as expected or not as expected; and causing display of, by the ledger system, a graphical user interface (GUI), that displays values of the detected operational characteristic that convey a functional status of the software system.

15. The system of claim 14, wherein the processing system is configured to perform further operations, comprising:

transmitting, to a user system associated with the software system, a message that conveys the functional status of the software system.

16. The system of claim 14, wherein the state machine maps the one or more processes of the software system to one or more money movements between accounts that are reported via the stream of ledger transaction messages.

17. The system of claim 16, wherein the processing system is configured to perform further operations, comprising:

determining whether the balance for the one or more states is zero or not zero, wherein a determination that the balance is not zero indicates that the software system is not operating as expected and a determination that the balance is zero indicates that the software system is operating as expected.

18. The computer-implemented method of claim 1, wherein each ledger transaction message in the stream of ledger transaction messages is stored in a data store coupled with the ledger system.

19. The computer-implemented method of claim 1, wherein the state machine models a plurality of events that cause a transition between two states of the state machine.

20. The non-transitory computer readable storage medium of claim 9, wherein each ledger transaction message in the stream of ledger transaction messages is stored in a data store coupled with the ledger system.

* * * * *